United States Patent [19]

Wang

[11] 4,327,421
[45] Apr. 27, 1982

[54] CHINESE PRINTING SYSTEM

[75] Inventor: Gary Y. Wang, Wellesley, Mass.

[73] Assignee: Transtech International Corporation, Wellesley, Mass.

[21] Appl. No.: 686,216

[22] Filed: May 13, 1976

[51] Int. Cl.³ .......................... G06F 3/09; B41J 5/00
[52] U.S. Cl. .................................. 364/900; 400/110; 400/484
[58] Field of Search .................... 340/172.5; 364/200 MS File, 900 MS File, 419; 400/484, 485, 486, 109, 110

[56] References Cited

U.S. PATENT DOCUMENTS

| | | | |
|---|---|---|---|
| 2,427,214 | 9/1947 | Kao | 197/1 A |
| 2,458,339 | 1/1949 | Buhler et al. | 197/1 A |
| 2,471,807 | 5/1949 | Yen | 197/1 A |
| 2,526,633 | 10/1950 | Brumbaugh | 197/1 A |
| 2,613,794 | 10/1952 | Yutang | 197/1 A |
| 2,613,795 | 10/1952 | Yutang | 197/1 A |
| 2,728,816 | 12/1955 | Kao | 400/200 |
| 2,950,800 | 8/1960 | Caldwell | 400/200 |
| 3,405,395 | 10/1968 | Wallin | 364/200 |
| 3,465,299 | 9/1969 | Schellenberg | 364/900 |
| 3,582,900 | 6/1971 | Goldman | 364/900 |
| 3,634,828 | 1/1972 | Myers et al. | 340/172.5 |
| 3,697,958 | 10/1972 | Larew | 340/172.5 |
| 3,760,366 | 9/1973 | Gregor et al. | 340/172.5 |
| 3,803,558 | 4/1974 | Jones et al. | 340/172.5 |
| 3,809,204 | 5/1974 | Ogawa | 197/1 A |
| 3,811,113 | 5/1974 | Saito et al. | 364/900 |
| 3,820,644 | 6/1974 | Yeh | 400/200 |
| 3,833,891 | 9/1974 | Howard et al. | 340/172.5 |
| 3,857,720 | 12/1974 | Park | 400/110 X |
| 3,905,022 | 9/1975 | Klosky et al. | 340/172.5 |
| 3,927,752 | 12/1975 | Jones et al. | 400/200 |
| 3,950,734 | 4/1976 | Li | 364/200 |
| 3,996,569 | 12/1976 | Saunders | 364/200 |
| 3,999,168 | 12/1976 | Findley et al. | 340/172.5 |
| 4,005,390 | 1/1977 | Findley | 340/172.5 |
| 4,010,837 | 3/1977 | Gremillet | 400/484 X |
| 4,020,465 | 4/1977 | Cochran et al. | 364/900 |
| 4,096,934 | 6/1978 | Kirmser et al. | 400/110 |

*Primary Examiner*—Raulfe B. Zache
*Attorney, Agent, or Firm*—Weingarten, Schurgin & Gagnebin

[57] ABSTRACT

A method and apparatus for printing Chinese or other ideographic characters. An operator enters upon a keyboard a sequence of sub-structures composing the character to be printed. The particular set of sub-structures disclosed enables an operator to type in the sub-structures in a manner substantially identical with the way in which the words would be written, thus minimizing special training necessary for the operation of the system. Apparatus is disclosed for processing signals from the keyboard to identify and print in dot-matrix form the proper Chinese characters.

15 Claims, 7 Drawing Figures

CHINESE PRINTING SYSTEM

FIELD OF THE INVENTION

This invention is concerned with a system for printing Chinese characters and more particularly for printing Chinese characters in response to sub-components thereof typed on a keyboard.

BACKGROUND OF THE INVENTION

The Chinese language and some other Oriental languages are written in characters which are composed of a number of strokes of varying sizes and positions within each character. In contrast with languages such as English and other European languages which employ alphabets having a small number of letters, Chinese language characters are not readily disassembled or reassembled. The complete Chinese vocabulary contains approximately 15,000 different words, although only 4,000 to 8,000 words are necessary for normal communication. Thus, typing and printing this large number of individual characters poses unique problems and is extremely difficult.

Methods for mechanizing Chinese typing and printing have been developed based on several different techniques. In one approach, the individual strokes used in writing a Chinese character are each typed in the sequence in which they would be written. While a relatively small number of keys are necessary to represent these basic strokes, a large number of strokes are required for designating each character due to the complexity of most Chinese words. Another approach at the other extreme from the single stroke approach employs individual keys for each character. Since over 4,000 characters are needed for general communication, these machines are large and require a great deal of operator training. In a third approach, a set of word-roots are defined as sub-structures of Chinese words. In addition, a set of control symbols are used to denote the relative positions and connectivity between the word-roots. While this approach results in a manageable keyboard and reasonable efficiency, a great deal of operator training is necessary.

BRIEF DESCRIPTION OF THE PRESENT INVENTION

In the present invention, a set of commonly used sub-structures and basic strokes of Chinese words is disclosed which are used in implementing an efficient Chinese printing system. The particular set of sub-structures used is limited to less than 256 for easy access by a human operator and to allow efficient digital coding of the sub-structures by an 8-bit coded word. The sub-structures are typed into the system by an operator in the same sequence in which they would be normally written, thus minimizing the operator training necessary. Thus, any Chinese character may be uniquely identified by typing in the appropriate sub-structures in the proper order.

The system also contains a dictionary stored within a memory which associates each particular sub-structure sequence with digital data for printing in dot-matrix form the Chinese character designated by the sub-structure sequence. This allows the system to display and print Chinese characters which are precisely formed and aesthetically pleasing. A microprocessor control system is used for associating the sequence of sub-structures entered via a keyboard by an operator with the dot-matrix information corresponding to the Chinese character designated by the sequence.

DESCRIPTION OF THE DRAWINGS

These and other advantages of the present invention will become more apparent with a reading of the following detailed description of the invention in conjunction with the figures of which:

FIG. 1 shows a particular set of Chinese sub-structures developed for designating Chinese characters;

FIG. 4 shows an example of the characters printed by the invention;

DETAILED DESCRIPTION OF THE PREFERRED EMBODIMENT

As used herein, the term "ideogram" or "ideographic character" refers to a picture or pictorial symbol as an original (not phonetic) element of writing. Examples of ideographic characters include Chinese and Japanese characters and hieroglyphics.

Figure 1A:
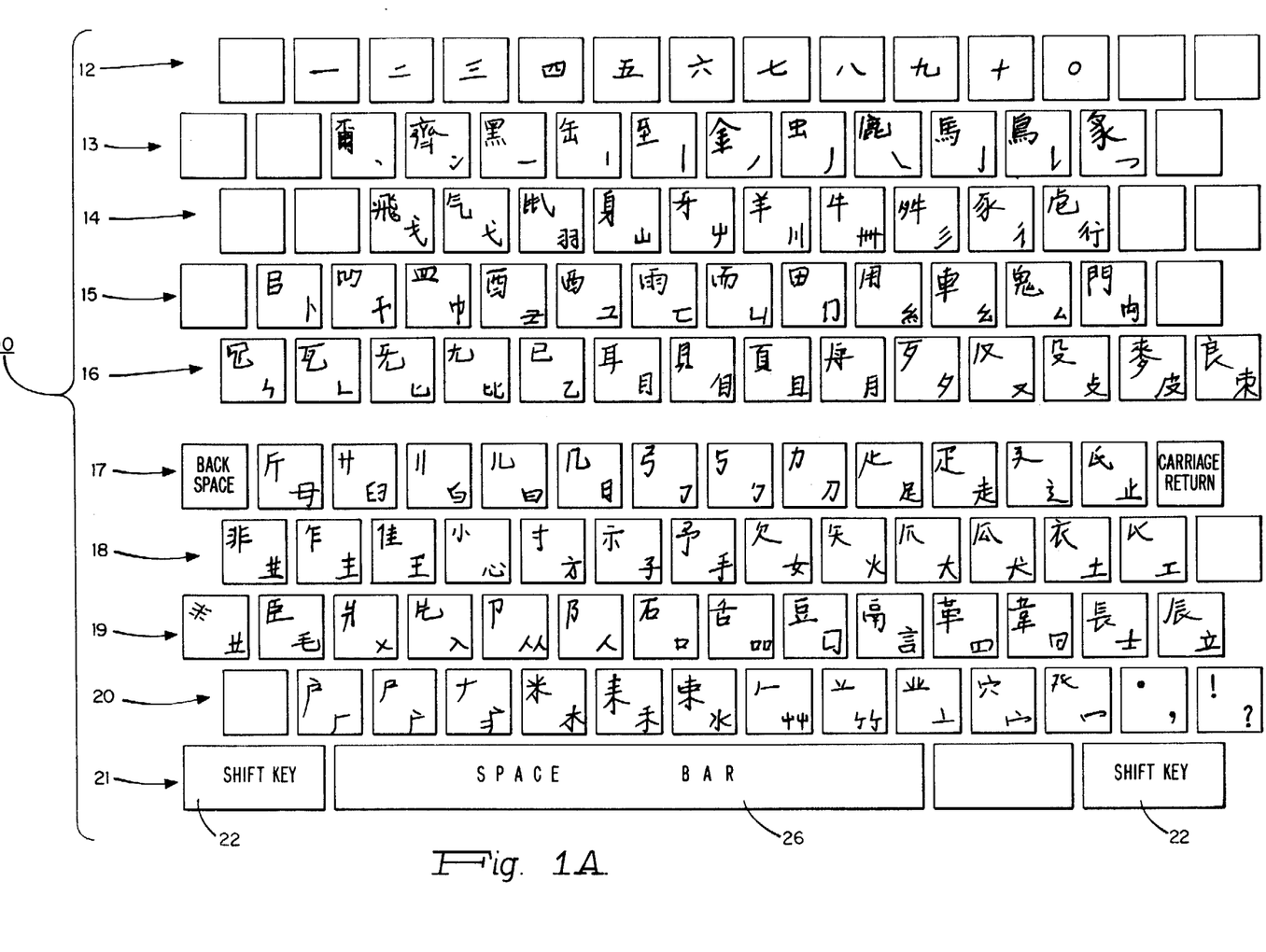
FIG. 1A shows a keyboard used with the present invention.

The present invention is concerned with composition and printing of Chinese characters from symbols typed on a keyboard by an operator. Three important considerations in the invention are: correctly formed and aesthetically pleasing characters, an input keyboard having a manageably small number of symbols for easy access by a human operator and for reducing the electronics required by the system, and a natural algorithm for designating which Chinese character is to be printed and which follows standard practices of Chinese writing so that the system operation may be quickly and easily learned by an operator without the necessity of memorizing a large number of artificial rules or steps for designating the desired Chinese character. One of the important elements of the present invention is the identification of a set of commonly used sub-structures and basic strokes within Chinese words, referred to as alphabets, which meets the above requirements of limited number and simple input algorithm. This set of sub-structures is shown in FIG. 1. FIG. 1A shows a keyboard which may be used with the present invention and which contains the set of sub-structures or alphabets which have been developed to provide the aforementioned goals. Each individual character from the set of characters shown in FIG. 1 will be referred to hereinbelow as an alphabet.

As can be seen from FIG. 1A, the keyboard consists of nine rows 12-20 of keys, each row having 10-14 keys with one or two alphabets thereon. A tenth row, 21, contains shift keys 22 and space bar 26 which operate in the conventional manner. The top row 12 of keyboard 10 contains keys having the Chinese numerals 0 through 9. Only one character is on each of these keys, and thus the character produced by depressing the keys of top row 12 are independent of the position of shift keys 22. The keys of the remaining rows 13 through 20 each contain two alphabets. These keys are operative with the shift keys 22 in the conventional manner, such that when a key is pressed alone, the alphabet shown on the lower portion of the key will be produced, while the alphabet shown on the upper portion of the key will be produced when it is pressed in conjunction with shift key 22.

It can be seen that the lower case positions of the keys in row 13 contain alphabets which correspond with the classical strokes used in writing Chinese characters. The remaining characters on rows 13 through 20 contain more complex alphabets composed of a plurality of these basic strokes. Some of the alphabets correspond with radicals, which are the sub-structures by which Chinese words are commonly alphabetized. The remainder of the alphabets are sub-structures which have been developed for the invention and which have proved to be the most useful symbols in producing a Chinese character printing system with the simplest possible operation.

The keyboard shown in FIG. 1A contains 194 alphabets plus 11 numbers, punctuation marks and control keys. Of these alphabets, approximately 151 duplicate classical radicals, while approximately 43 alphabets are sub-structures developed and chosen for use with the novel printing system of the present invention.

It can be seen that keyboard 10, shown in FIG. 1A, is roughly equivalent to two conventional English keyboards. Thus, an operator familiar with a conventional English keyboard should not have a great deal of difficulty in becoming accustomed to the keyboard of FIG. 10. Although the number of keys in keyboard 10 is approximately twice that of a normal English keyboard, this number of keys is a great improvement over the number required in many previous types of Chinese character printing systems. Especially in view of the natural method by which the Chinese characters are typed on the keyboard described in greater detail below, the keyboard shown in FIG. 1A has proven itself to be a very efficient and effective way for a human operator to interface with the electronics of the invention to print the desired Chinese characters.

It should be appreciated that while the keyboard arrangement shown in FIG. 1A is one particularly useful and effective arrangement of the alphabets shown, many other arrangements are possible. Thus, the keyboard arrangement shown in FIG. 1A is for illustrative purposes only.

Figure 2:
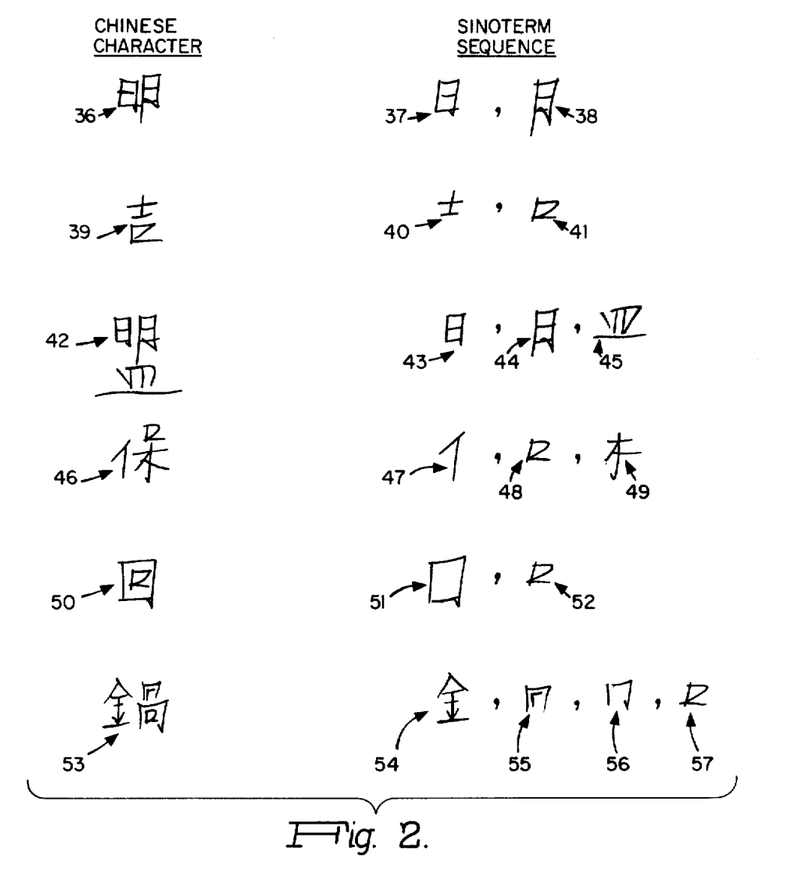
FIG. 2 contains Chinese characters useful in explaining the operation of the present invention.

Referring to FIG. 2, the method by which a particular Chinese characters is typed into the machine using the alphabets shown in FIG. 1 is explained. Each Chinese character is represented by two or more alphabets which are entered into the system in a particular order in accordance with a set of rules, described below.

This order is essentially the same as the order in which Chinese characters are normally written. Thus, decomposing a Chinese character into the proper sequence of alphabets does not entail learning an elaborate set of rules. Once the set of alphabets, shown in FIG. 1, has been mastered, determining the alphabets from which a Chinese characters is formed and the order in which the alphabets are entered will come naturally to one with a working knowledge of written Chinese.

FIG. 2 contains Chinese characters showing the rules by which characters are divided into the appropriate alphabet sequences. FIG. 2 contains two columns: the left-hand column being a Chinese character and the right-hand column being the sequence of alphabets which an operator would type on the keyboard shown in FIG. 1A to designate that character.

The first rule is that characters are typed from left-to-right. This is illustrated in FIG. 2 by word 36, which is the Chinese character for "brightness." This character is typed into the machine as shown in the right-hand column by first typing in alphabet 37, the left-most alphabet in word 36, and next typing in alphabet 38.

The second rule is that Chinese characters are typed from top-to-bottom. As shown in FIG. 2, character 39, the Chinese character for "luck," is typed by first typing the top-most alphabet 40, followed by the lower alphabet 41, The third rule is that characters are divided from upperleft-to-lower-right. The Chinese character for "ally," 42, is an example of the application of this rule, and the component alphabets 43-45 are typed in the order shown. The Chinese character for "protect," 46, is divided into alphabets 47-49, as shown. This result may be obtained by either: first applying the left-to-right rule and typing alphabet 47, after which the top-to-bottom rule is applied and alphabets 48 and 49 are typed; or applying the upper-left-to-lower-right rule, in which case alphabets 47-49 are immediately typed in the order shown.

The fourth rule is that Chinese characters are generally typed from the outside to the inside. This is shown by the Chinese character for "return," 50. In typing character 50, the outside alphabet 51 is first typed, followed by the inside alphabet 52.

The combination of the above rules is shown by the Chinese character for "pot," 53. First, the left-to-right rule is applied and alphabet 54 is typed. Next, the top-to-bottom rule is applied and alphabet 55 is typed. Next, the outside-to-inside rule is applied and alphabets 56 and 57 are typed in the order shown.

Exceptions to the order produced by the above rules exist; but since the exceptions correspond with the order in which a character is usually written, they are easily recognized and rememberd by an operator. From the above explanation of the manner in which Chinese characters are typed into the printer system, it can be seen that a minimum of training is required for an operator to become proficient with the system. After an operator has become familiar with the alphabets used by the system, dividing each Chinese word into the appropriate alphabets and typing them in the appropriate order is simply done.

Once a particular sequence of alphabets has been typed in by an operator, the space bar is pressed to indicate the end of the word, and the system searches for a corresponding sequence of alphabets, as explained in greater detail below. The Chinese character corresponding to that sequence is then displayed to the operator for verification. Using the set of alphabets shown in FIG. 1, it has been determined that only a very few Chinese characters will be sub-divided into alphabet sequences which may produce ambiguity. In fact, a careful analysis has indicated that out of a vocabulary of over 8,000 Chinese characters, there are less than five characters which produce ambiguous alphabet sequences. The few alphabet sequences designating these particular characters are differentiated by further subdividing particular alphabets, which might otherwise be typed by a single key, to produce distinctive sequences for each character. Thus, an operator may easily memorize the few numbers of ambiguous Chinese characters and their particular alphabet sequences. Additionally, if the alphabet sequence corresponding with a particular ambiguous Chinese character is incorrectly typed, this is immediately indicated upon the display to the operator so that the operator may check to determine the correct sequence for that particular character.

Figure 3:
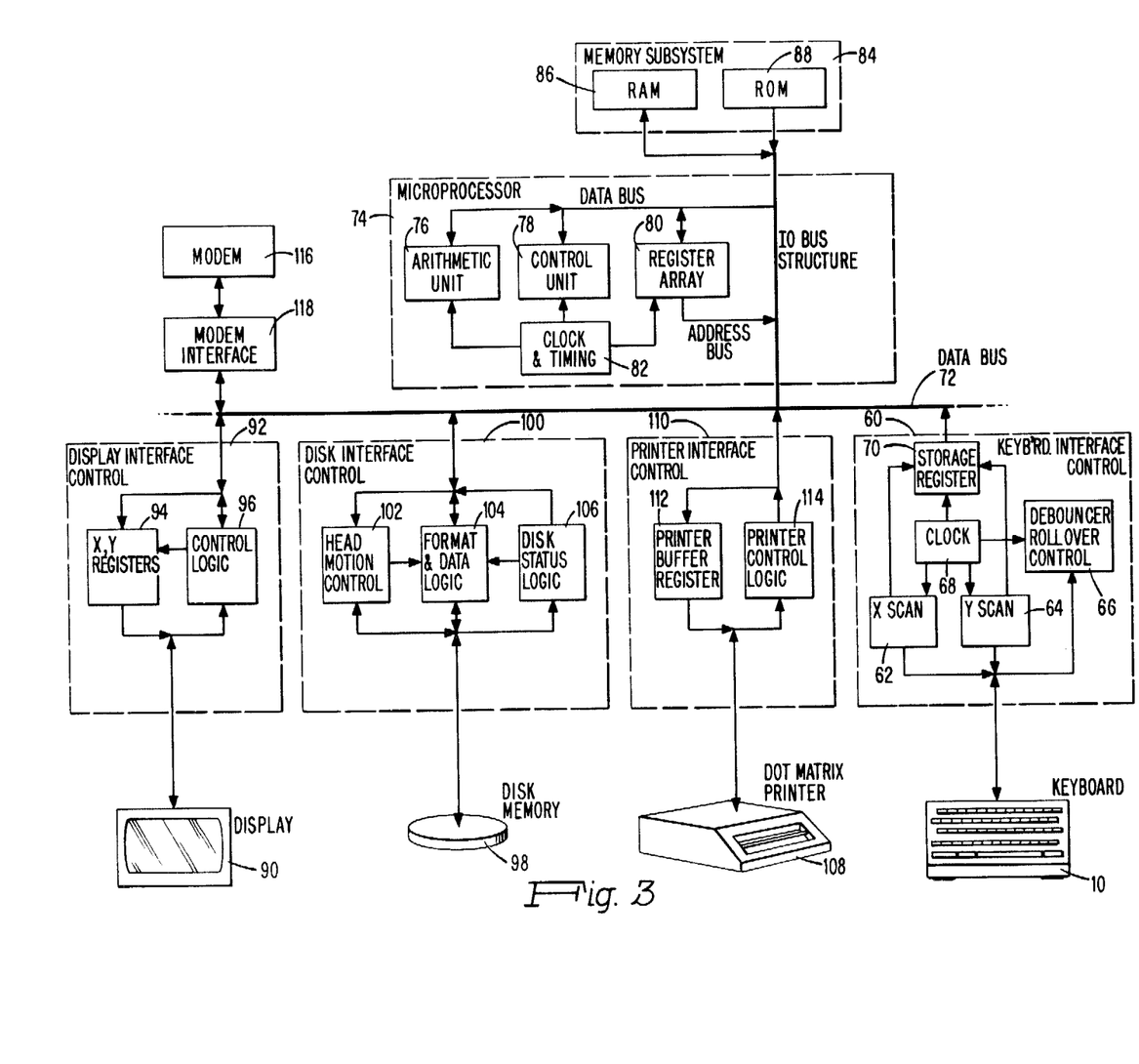
FIG. 3 is a block diagram of the electronics of the invention.

FIG. 3 is a block diagram showing the electronics of the printing system. The principal parts of the system with which an operator is concerned are the keyboard 10, a display 90, and a printer 108. The remainder of the system serves to control the flow of information within the system and is explained in detail below.

To use the system, an operator types each of the alphabets composing a Chinese character in the proper sequence via keyboard 10. As each of these alphabets is typed, it appears in sequence upon a portion of display 90, which will be referred to as the alphabet display area. This allows the operator to verify the sequence of alphabets which has been typed. If an incorrect alphabet is typed, the operator types the backspace key, which serves to erase the last alphabet typed from the alphabet display area. After a complete sequence of alphabets corresponding with a Chinese character has been typed, the space key is depressed. This causes the system to display the Chinese character in the character display area of display 90. When the first alphabet of the next Chinese character is depressed, the previously typed alphabets in the alphabet display area of display 90 are erased, and the first alphabet of the next Chinese character is displayed. This process continues, and Chinese characters are added to the character display area of display 90 until a complete line of Chinese characters is displayed. By typing the backspace key after a complete Chinese character has been typed and entered by the space key, the previous character may be deleted from the character display area of display 90. The backspace key may be typed several times to delete several words. After a complete line of Chinese characters has been typed and displayed on display 90, the operator types a carriage return. This causes the line of characters to be printed by dot-matrix printer 108 and clears display 90. This process is repeated to print following lines of Chinese characters.

The electronics shown in FIG. 3 operate as follows. Signals from keyboard 10 are applied to a keyboard interface control 60. Within keyboard interface 60 are X-scan and Y-scan logic controls 62 and 64, which apply signals to the matrix of keys in keyboard 10 for determining which key or keys have been depressed. Output signals from keyboard 10 are applied to debounce/roll-over control 66, which processes and eliminates signals resulting from simultaneous depression of two or more keys and from switch contact bounces in the conventional manner. Clock 68 applies clock signals to X-scan logic 62, Y-scan logic 64, roll-over control 68, and storage register 70. An 8-bit binary number indicating which key from keyboard 10 has been depressed is stored in storage register 70 where it is applied to data bus 72.

The system is controlled by a microprocessor 74, which preferably operates on 8-bit data words. Microprocessor 74 typically contains an arithmetic unit 76, a control unit 78, an array of registers 80, and clock and timing circuits 82. Many microprocessors are commercially available which may be used in implementing the invention, and the general principles associated with the operation of these microprocessors are well known to those in the art. One microprocessor suitable for use with the present invention is the Intel 8080 Microprocessor. This microprocessor is well known and widely available, and extensive documentation of its structure and operation is available. For this reason, the detailed operation and structure of microprocessor 74 need not be further elaborated upon hereinbelow.

Microprocessor 74 is connected to memory sub-system 84 by means of data bus 72. Memory sub-system 84 may be sub-divided into random-access memory 86 and read-only memory 88. Variables used and required by the microprocessor are written into and read from random-access memory 86 during operation. Read-only memory 88 is preprogrammed and contains unalterable binary data. The binary data stored in read-only memory 88 designates the steps carried out by microprocessor 74 by which the microprocessor controls the rest of the system. Appended to this application is an exemplary list of microprocessor instructions which might be stored in read-only memory 88 for carrying out the functions of the invention described in this application, which list of binary microprocessor instructions is particularly adapted for use with the aforementioned Intel 8080 type of microprocessor.

As the operator types in each alphabet to form a sequence of Chinese characters, the individual alphabets and the current line of characters is displayed on display 90 in the manner described above. In the preferred embodiment being described, display 90 may be implemented by a Digivue 80-33 plasma display. This display is a plasma panel display which does not require information refresh. The display is a dot-matrix type of display having 80 vertical by 256 horizontal displayable dots. In the present invention, display 80 is divided into two display areas. The top portion is the character display area which displays the Chinese characters which have been typed into the current line; and the bottom portion is the alphabet display area on which are displayed the current sequence of alphabets. Display 90 is controlled by interface control 92. In operation, microprocessor 74 received the characters typed on keyboard 10. After processing this data, microprocessor 74 sends the appropriate signals to display interface control 92, causing the desired Chinese characters and/or alphabets to be displayed on display 90. Within display interface 92 are X and Y registers for addressing the particular dots within display 90 to be activated, and control logic 94 for controlling the flow of information sent by microprocessor 74 through data bus 72 to display 90.

A disk memory 98 is used to store the input alphabet sequences and the corresponding output word pattern, as described below. Disk memory 98 allows a large amount of data to be stored while giving rapid access to all data relative to the speed of the alphabets being typed by an operator on keyboard 10. One disk memory unit suitable for use with the present invention is an Innovex 220 Floppy Disk. Disk memory 98 is controlled by disk interface control 100 in the conventional manner. Within disk interface control 100 are circuits for head motion control, logic for formatting the data and direct memory access 104, and disk status logic 106. Disk interface control 100 is controlled by microprocessor 74 via signals transmitted along data bus 72.

Chinese characters typed in by an operator on keyboard 10 are ultimately printed by printer 108. This printer is preferably a dot-matrix-type of printer; and one printer suitable for use with the present invention is a Printronix 300 dot-matrix printer. Chinese characters are stored in the system as a 16 (horizontal)×18 (vertical) dot-matrix. With a printer of the type specified, 44 characters may be printed across the page. Printer 108 is connected with data bus 72 via printer interface control 110. Within printer interface control 110 are a printer buffer register 112 for holding data while it is printed, and printer control logic 114.

It should be appreciated that methods of displaying and printing the Chinese characters in other than dot-matrix form may be used with the invention; and the description of the particular method for displaying and printing Chinese characters used in the preferred embodiment disclosed herein is for exemplary purposes only and is not to be construed as a limitation upon the invention.

Additionally, it may be desired to transmit data representative of Chinese characters to other data processing devices for further use. This may be done by means of a modem 116 connected to data bus 72 via a modem interface circuit 118, as shown in FIG. 3.

FIG. 4 is an example of the quality of Chinese printing printed by printer 108 which can be achieved by the present invention. As explained above, the characters may be rapidly typed into the present invention by an operator having minimal training. The invention then quickly and efficiently causes the Chinese characters to be printed. As can be seen from FIG. 4, not only does the present invention result in efficient printing of the Chinese characters, but also, the printed characters are very close reproductions of the classical Chinese characters, resulting in an aesthetically pleasing printed page.

Figure 5:
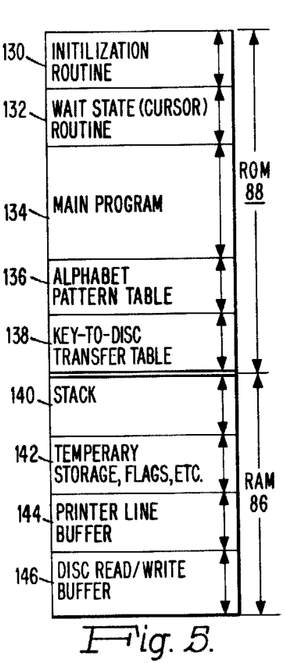
FIG. 5 is a memory map of the memory shown in FIG. 3.

FIG. 5 is a memory map showing the organization of random-access memory 86 and read-only memory 88. The initialization routine 130 is located at the beginning of read-only memory 88. This routine presets the system variables to the proper values, clears the microprocessor registers, and performs other functions necessary for proper system start-up. The initialization routine occupies about 200 8-bit words of memory. Following initialization routine 130 is wait state routine 132. During periods that the microprocessor is idle, the system performs the wait state routine until the operator types a key on keyboard 10. During this period, wait state routine 132 causes a cursor to be displayed by display 90 at the location where the next alphabet will appear. Wait state routine 132 requires about 125 words of memory.

Main program 134 is located next in memory. This program performs the major functions of the microprocessor and is described in further detail below. Main program 134 requires about 2K words of memory.

Following main program 134 in memory is alphabet pattern table 136. This table 136 contains digital data corresponding with the patterns to be displayed in the alphabet display area of display 90 in response to the particular alphabets keyed in by an operator via keyboard 10. In response to an 8-bit code from keyboard 10, microprocessor 74 consults alphabet pattern table 136 to retrieve the proper dot-matrix data for displaying the alphabet on dot-matric display 90. Table 136 requires about 2.7K words of memory.

Following alphabet pattern table 136 in read-only memory 88 is key-to-disk transfer table 138. Table 138 contains the location of the track in disk memory 98 where alphabet sequences beginning with each of the alphabets are located. This information is utilized by microprocessor 74 in determining the Chinese character corresponding with a particular sequence of alphabets which has been typed in by an operator. Key-to-disk transfer table 138 requires about 256 words of memory.

Following read-only memory 88 is random-access memory 86. The first part of the random-access memory 86 contains stack 140 which contains address pointers and other information required by microprocessor 74 in branching to and from sub-routines. Following stack 140 is temporary storage 142 containing status flags and program variables.

Next in random-access memory is printer line buffer 144. Line buffer 144 contains dot-matrix display information corresponding to the characters currently displayed in display 90. This information is stored in line buffer 144 until the system causes these characters to be printed by printer 108. Line buffer 144 requires about 1.6K words of memory.

Following buffer 144 is disk read/write buffer 146. This storage space is used for information read from disk memory 98. Once the initial alphabet of a sequence is typed, all alphabet sequences beginning with that alphabet and the dot-matrix display data for corresponding Chinese characters is written in this area of random-access memory 86. After the end of the alphabet sequence is indicated by typing a space key, these stored sequences are searched to find a sequence which matches the typed sequence; and the dot-matrix display data for the corresponding Chinese character is displayed by display 90 and stored in line buffer 144.

Figure 6:
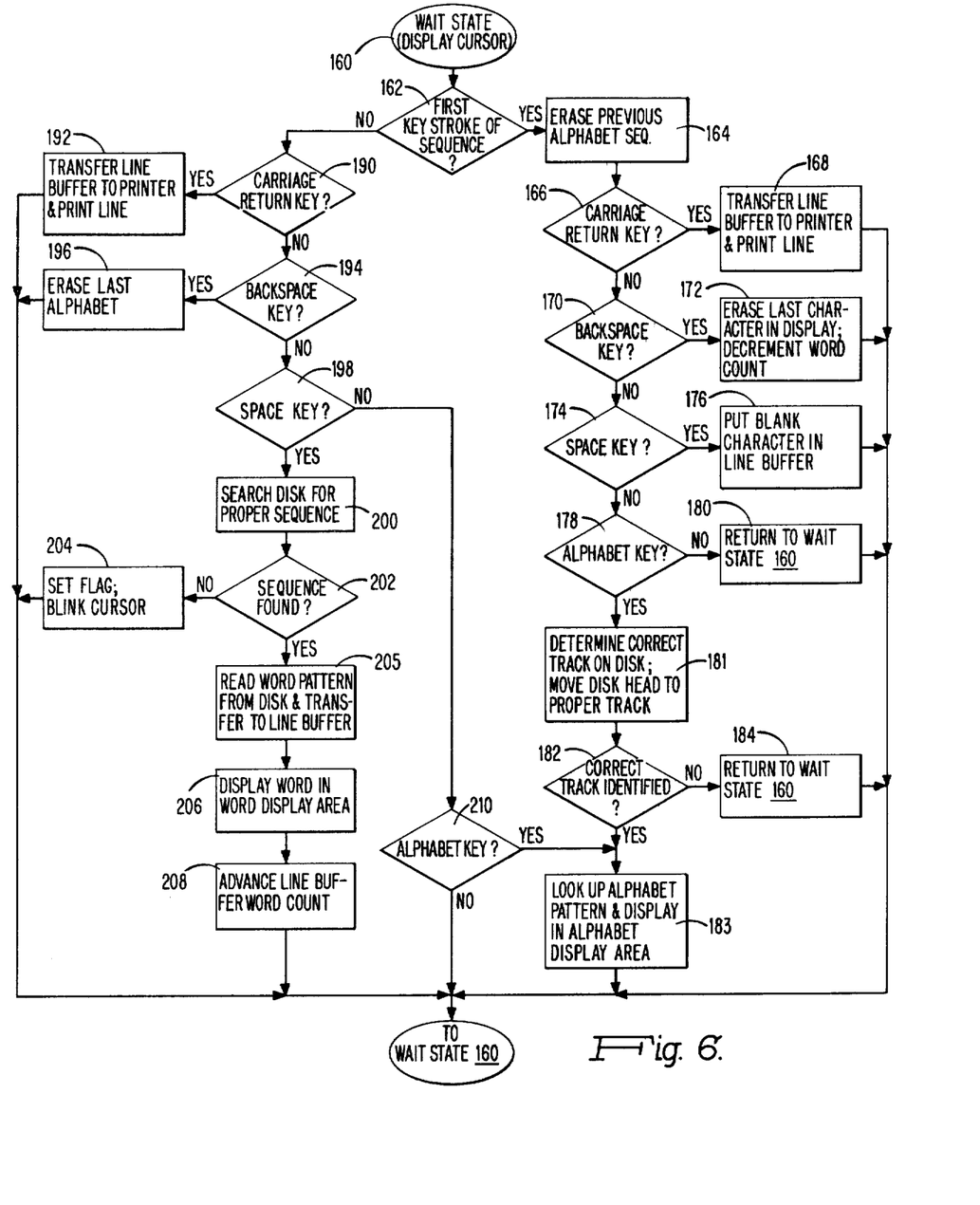
FIG. 6 is a flow diagram showing the steps carried out by the invention in printing Chinese characters.

FIG. 6 is a flow diagram showing the steps carried out by microprocessor 74 in displaying and printing the Chinese characters entered by an operator on keyboard 10. The microprocessor starts out in a wait state, block 160. In the wait state, the microprocessor causes a cursor to be displayed in the word display area of display 90 indicating the position of the next character. In response to the operator typing a key on keyboard 10, the microprocessor advances to block 162 and determines whether the key stroke is the first key stroke of a sequence of alphabets. If the key stroke is the first key stroke, the microprocessor 74 erases the previous alphabet sequence displayed in the alphabet display area of display 90, block 164. The microprocessor next checks to determine what type of key was depressed.

If a carriage return key was depressed, block 166, the microprocessor transfers to printer 108 the contents of line buffer 144 containing the dot-matrix information necessary to print the characters in the present line, the line of Chinese characters is printed, and the paper is advanced, block 168. After printing a line of characters, microprocessor 74 then returns to wait state 160.

If the key was not a carriage return key, microprocessor 74 next checks to determine if the key was a backspace key, block 170. If the key was a backspace key, the system deletes this word from the display 90, and decrements the line buffer word count by one effectively erasing this character from the line buffer, block 172. After deleting the last character, the system then returns to wait state 160.

If the key was not a backspace key, the system then checks to determine if the key was a space key, block 174. If the operator depresses the space key as a first key stroke of a sequence, the system will put a blank word in line buffer 144 and in display 90 and advance the word count by one, block 176. After this, the system will return to wait state 160.

The system next checks to determine if the operator has depressed an alphabet key, block 178. If it is determined that an alphabet key was not depressed, the system returns to wait state 160, block 180. This might occur, for example, if a blank key in keyboard 10 were depressed.

If the system determines that an alphabet key was depressed, microprocessor 74 consults key-to-disk transfer table 138 located within read-only-memory 88. This table tells in which track in disk memory 98 are located Chinese characters denoted by alphabet sequences beginning with the particular alphabet key just typed. From this information, microprocessor 74 sends signals to disk interface control 100 which cause the read/write head of disk memory 98 to be positioned over the correct track, block 181. By beginning this head movement immediately after the first alphabet of a sequence is typed in, any delay caused by the time required to move the magnetic head of disk memory 98 will take place during the time that the operator is typing in the remaining alphabets of the sequence and will not be noticed by the operator. In the event that the system does not identify a track on disk memory 98 which corresponds with the alphabet typed, block 182, the system returns to wait state 160, block 184. This might occur, for example, if a blank key on keyboard 10 were depressed. Once the correct track on disk memory 98 is identified, microprocessor 74 looks up the display pattern for the alphabet typed in alphabet pattern table 136 of read-only memory 88; and this pattern is sent to display interface control 92 where it is displayed in the alphabet display area of display 90, block 184. After this, the system returns to wait state 160.

The exemplary system described herein with a Chinese vocabulary of approximately 8,000 characters, as discussed above, does not require that alphabet sequences beginning with a particular alphabet be recorded in disk memory 98 upon more than a single track thereof. However, with a larger vocabulary or with different components other than the exemplary types specified hereinabove, a set of alphabet sequences beginning with the same alphabet might foreseeably require more than one track of disk memory 98 for storage. In this case, the determination of the correct track of disc memory 98 may require that the first two alphabets of the alphabet sequence be used, and the flow diagram of FIG. 6 would be modified accordingly.

If the key typed in by the operator is not the first key stroke of a sequence, block 162, the system operation will proceed via a different path. First, the system checks to determine if the key typed was a carriage return key, block 190. If an operator types a carriage return key in the middle of an alphabet sequence without having first typed a space key, the system will discard any alphabets in the sequence being displayed and transfer the characters already assembled in line buffer 144 to printer 108 where they will be printed and the paper advanced, block 192. The line buffer word count is then reset to zero.

If the key was not a carriage return key, the system next checks to see if the key typed was a backspace key, block 194. Typing a backspace key while a sequence of alphabets is displayed in the alphabet display area of display 90 causes the last alphabet to be erased from the display and from the alphabet sequence memory of microprocessor 74, block 196.

If the key was not a backspace key, the system next checks to see if a space key has been typed, block 198. Typing a space key after typing one or more alphabets indicates the end of the alphabet sequence, and the system will proceed to search the disk read/write buffer 146 stored in random-access memory 86 for a sequence of alphabets exactly corresponding to the sequence of alphabets which has been typed, block 200. If a sequence is not found stored in disk read/write memory 146, which corresponds exactly with the sequence which has been typed, block 202, microprocessor 74 sets a flag which indicates this, block 204, and returns to wait state 160. When this flag is set, the cursor displayed by wait state 160 is much larger in size and blinks on and off, indicating to an operator that no Chinese character corresponding to the alphabet sequence typed was found.

If a sequence is found in disk read/write buffer 146 which corresponds exactly with the alphabet sequence typed, block 202, the dot-matrix information for displaying the character is read from buffer 146 and transferred to line buffer 144, block 204. The dot-matrix information is also sent to display interface control 92 which causes the character to be displayed in the word display area of display 90, block 206, and the line buffer word count is incremented, block 208. The system then returns to wait state 160 until the operator enters the first key stroke of the next sequence.

If the space key has not been depressed, block 198, the system checks to determine if an alphabet key has been typed, block 210. If the operator has typed an alphabet key, the system proceeds to block 184 where the alphabet pattern is determined and displayed as described above. If an alphabet key was not depressed, block 210, the system returns to wait state 160.

It should be appreciated that modifications may be made by those of ordinary skill in the art to the preferred embodiment described hereinabove, which modifications do not fall outside the scope of the present invention. Accordingly, the scope of the invention is to be limited only as indicated in the appended claims.

What is claimed is:

1. A method for entering and reproducing Chinese characters in a data processing system comprising the steps of:
   - selecting from a predetermined set of sub-structures a series of one or more sub-structures for forming Chinese characters which define a character to be entered;
   - entering the selected sub-structures into the data processing system by typing selected keys of a keyboard having a plurality of keys each for indicating a respective one of said predetermined set of sub-structures from which characters to be entered can be composed, the keys of said keyboard being manually actuable to indicate the corresponding sub-structure;
   - the entering step further including the steps of an actual Chinese writing sequence comprising:
   - first, entering sub-structures sequentially as they occur in a character or sub-structure from left to right;
   - next, entering sub-structures sequentially as they occur in a character or sub-structure from top to bottom; and
   - next, entering sub-structures sequentially as they occur in a character or sub-structure from outside to inside; and
   - providing a plurality of sub-structured data sets stored in the data processing system representing sub-structure sequences corresponding with individual Chinese characters;

providing a plurality of second data sets stored in the data processing system, each corresponding with a respective one of the sub-structure data sets and each of the second data sets representing the actual form of the Chinese character to be reproduced;

determining when a complete series of sub-structures defining a character has been entered;

comparing the entered, complete sub-structure series with the stored sub-structure data sets representing sub-structure sequences corresponding with individual Chinese characters;

providing a first signal indication upon detection of a match between the entered sub-structure series and one of the stored sub-structure data sets representing sub-structure sequences;

providing a second signal indication if no sub-structure data set is found in said stored sub-structure data sets which matches the substructure series entered; and reproducing in response to said first signal indication and the stored sub-structure data set which matches the entered sub-structure series the Chinese character in the form represented by the second data set which corresponds to the stored sub-structure data set matched to the entered sub-structure series.

2. The method of claim 1 wherein the step of comparing further includes the steps of:

identifying the first sub-structure of a series of entered sub-structures defining a character to be entered;

selecting, from among the plurality of stored sub-structure data sets representing a like plurality of sub-structure sequences corresponding to individual characters, those data sets representing sequences beginning with the previously identified first sub-structure; and comparing the entered, complete sub-structure series with each of the selected stored sub-structure data sets representing sequences beginning with the previously identified first substructure.

3. The method of claim 1 wherein the reproducing step further includes the steps of:

retrieving, from among the plurality of second data sets, the corresponding second data set representing a corresponding Chinese character to be reproduced; and applying the corresponding second data set to an output device for displaying the corresponding Chinese character.

4. The method of claim 3 wherein sub-structures are entered by typing a corresponding key of an input keyboard and further including the steps of:

displaying each of the entered sub-structures as they are typed;

displaying the corresponding Chinese characters to be reproduced to verify that the correct sub-structure series was typed in; and periodically printing the displayed Chinese characters; and wherein the determining step includes the step of typing a key for indicating the end of a complete series of entered sub-structures.

5. A system for reproducing ideographic characters from among a stored set of such characters comprising:

a keyboard having a plurality of keys, each indicating a respective one of a predetermined set of sub-structures from which ideographic characters to be entered can be composed;

each key of said keyboard being manually actuable to provide an electrical signal representing the respective sub-structure;

the keyboard being operative to designate a character by sequential actuation of selected keys of said keyboard to provide electrical signals representative of an input series of sub-structures;

said keyboard having a key which is manually actuable to provide a first electrical signal representing the end of an input series of substructures;

memory means for storing a plurality of first data sets, each representative of a particular sequence of sub-structures designating a respective character;

said memory means being further operative for storing a like plurality of second data sets, each one of said second data sets corresponding with a respective one of said first data sets and being representative of the actual form of the ideographic character represented by the corresponding one of said first data sets;

means responsive to an input series of sub-structures entered via sequential actuation of selected keys of said keyboard and to said first electrical signal for searching the first data set stored in said memory means to identify a first set representative of the input series of sub-structures entered by said selected keys and for providing a signal representative of such identification; and means responsive to said signal representative of such identification and to the second data set stored in said memory means and corresponding to the identified first data set for reproducing the ideographic character in the form stored in said second data set.

6. The system of claim 5 wherein the means for searching further comprises:

means operable by said keyboard for identifying the first sub-structure of a series of entered sub-structures defining a character to be entered;

means operable in response to said first electrical signal for determining when a complete series of sub-structures defining a character has been entered;

means responsive to said determining means for comparing the entered, complete sub-structure series with the first data sets and for detecting an identical match therebetween;

means actuable by said comparing means for providing a representation of the second data set corresponding with the first data set matched with the entered complete sub-structure series and representing an individual ideographic character, upon detection by the means for comparing of a match between the entered sub-structure series and one of the first data sets representative of sub-structure sequences; and means actuable by said comparing means for providing an indication if no first data set is found representative of a sub-structure sequence which matches the sub-structure series entered.

7. The system of claim 6 wherein the means for searching further comprises:

means responsive to said identifying means for selecting, from among the plurality of first data sets representing a like plurality of sub-structure sequences corresponding to individual characters, those data sets representing sequences beginning with the first sub-structure identified by the means for identifying; and wherein the means for comparing compares the entered, complete sub-structure series with each of the selected first data sets representing sub-structure sequences beginning with the first sub-structure identified by the means for identifying.

8. The system of claim 7 wherein the ideographic characters are Chinese characters.

9. The system of claim 8 wherein the predetermined set of substructures indicated by the keys of said keyboard and from which the Chinese characters to be entered can be composed, includes the set of sub-structures as shown in FIG. 1.

10. The system of claim 5:
wherein the system is adapted for reproducing Chinese characters; and
wherein the keyboard includes keys for entering the sub-structures shown in FIG. 1.

11. The system of claim 5 wherein the second data sets comprise binary information representative of those locations in a dot-matrix type of representation which are to be activated to provide a representation of the corresponding particular ideographic character; and
wherein the reproducing means reproduces the ideographic characters in dot-matrix form.

12. The system of claim 11 further including:
means operable by the keyboard for storing and displaying sub-structures as they are typed on the keyboard; and
wherein the means for reproducing includes means for displaying the characters in response to the second data set corresponding with the first data set identified by the means for searching.

13. For entering Chinese characters into a data processing system, a keyboard comprising:
a plurality of keys;
a like plurality of signal means, each connected to a respective one of said keys and responsive to actuation of the connected key, for producing an electronic signal representative of the actuation of the connected key;
the keys of said keyboard each indicating at least one respective sub-structure of a predetermined set of sub-structures from which Chinese characters to be entered can be composed, said set of sub-structures the set of sub-structures as shown in FIG. 1;
each of said keys having thereupon a graphic representation of at least one of said sub-structures corresponding with the at least one respective sub-structure indicated by the key.

14. The keyboard of claim 13 wherein a plurality of said keys are each for indicating one of two of said sub-structures, each having thereupon graphic representations of the two sub-structures to be indicated; and
wherein the keyboard includes a shift key for indicating which of said two sub-structures represented on said plurality of keys is indicated by the depression of said key.

15. The keyboard of claim 14 further including a space key and keys for producing signals representative of numerical values and having a graphic representation of the corresponding Chinese symbol therefor; and
wherein the plurality of keys having graphic representations of the two sub-structures to be indicated and of the corresponding Chinese symbols for numerical values and including said shift key is arranged as shown in FIG. 1A.

* * * * *